United States Patent Office 3,706,678
Patented Dec. 19, 1972

3,706,678
HYDROPHILIC POLYURETHANE FOAMS PREPARED FROM BIURET CONTAINING POLYISOCYANATES
Werner Dietrich, Cologne, Stammheim, and Karlheinz Andres, Cologne, Flittard, Germany, assignors to Bayer Aktiengesellschaft, Leverkusen, Germany
No Drawing. Filed Aug. 3, 1970, Ser. No. 60,711
Claims priority, application Germany, Aug. 7, 1969,
P 19 40 182.2
Int. Cl. A01c 1/04; C08g 22/44
U.S. Cl. 260—2.5 AD                    7 Claims

ABSTRACT OF THE DISCLOSURE

A process is provided for the production of open celled foam resins having a bulk density of from about 6 to about 15 kg./m.$^3$ from organic polyisocyanates, organic compounds which contain at least two hydrogen atoms reactive with NCO groups, water and, if desired, other additives, characterized in that the organic polyisocyanates contain biuret groups and the water used for the foaming reaction is added in quantities of from about 20 to about 100 parts by weight per 100 parts by weight of the organic compounds which have at least two hydrogen atoms reactive with NCO groups.

---

The production of foam resins from polyols, polyisocyanates and blowing agents has been disclosed. The foaming action is produced by carbon dioxide which is chemically obtained by the reaction between water and isocyanate groups, and/or by the volatilization of selected organic solvents due to the heat of the reaction, particularly halogenated alkanes such as monofluorotrichloromethane. Further, the ratio of open to closed cells in the foam can be adjusted by the proportion of solvent used since the percentage of closed cells increases with increasing quantities of solvent.

Although foam resins can be easily produced with the customary polyisocyanates using high concentrations of water, the products which are obtained are brittle and have low compression strength and particularly inadequate thermal stability. As a consequence, polyurethane foams which have a bulk density of less than 20 kg./m.$^3$ have not been important commercially heretofore.

It is therefore an object of this invention to provide polyurethane foams which are devoid of the foregoing disadvantages and a method for preparing them.

Another object of this invention is to provide polyurethane foams having a bulk density of less than about 20 kg./m.$^3$ which are nonbrittle, open celled, hard foams having good compression strengths and adequate thermal stabilities and a method for preparing them.

Yet another object of this invention is to provide predominantly open celled foams regardless of the quantity of organic solvent used as the blowing agent and a method for preparing them.

A further object of this invention is to provide nonbrittle, open celled, hard foams having a bulk density of less than about 20 kg./m.$^3$, good compression strength and adequate thermal stability which may be used industrially as insulators and a method for preparing them.

A still further object of this invention is to provide hydrophilic foams which can be used as substrates for plant breeding and cultivation and a method for preparing them.

The foregoing objects and others which will become apparent from the following description are acomplished in accordance with this invention, generally speaking, by providing foam resins having a bulk density of less than about 20 kg./m.$^3$, which are nonbrittle, open celled, hard foams having good compression strength and adequate thermal stability by a process wherein organic polyisocyanates containing biuret groups are reacted with organic compounds containing at least two hydrogen atoms reactive with NCO groups, water and any other desired additives with the proviso that the water used for the foaming reaction is employed in quantities of from about 20 to about 100 parts by weight per 100 parts by weight of the organic compound containing the active hydrogen atoms. In the practice of this invention any other desired blowing agent may also be used in addition to the water including organic solvents.

It has now surprisingly been found that predominantly open celled, hard foams having a bulk density in the range of from about 6 to about 15 kg./m.$^3$ which are free from the disadvantages mentioned above can be produced regardless of the quantity of organic solvent which is used as the blowing agent if the organic polyisocyanate reactant contains biuret groups and if at least 20 parts by weight of water per 100 parts by weight of the polyol are used for foaming. The foam resins obtained will therefore contain predominantly polyurea bonds in addition to the polyurethane bonds.

Any organic compound containing at least two hydrogen atoms reactive with NCO groups can be used in the process of this invention, preferably compounds which contain hydroxyl groups such as, for example, monomeric polyvalent alcohols, polyhydroxy polyethers, polyhydroxy polyesters and mixtures thereof. Some suitable monomeric polyvalent alcohols include, for example, ethylene glycol, 1,2-propylene glycol, 1,3-propylene glycol, 1,4-butanediol, 1,6-hexanediol, glycerol, trimethylol propane, erythritol, pentaerythritol, sorbitol, sucrose and so on. Some suitable polyhydroxy polyethers include particularly those having an OH number of from about 30 to about 600 obtained, for example, by reacting an alkylene oxide such as ethylene oxide and/or propylene oxide with monomeric polyvalent alcohols such as those mentioned above.

Some suitable polyhydroxy polyesters include particularly those having an OH number of from about 30 to about 600 obtained by the polycondensation of monomeric polyvalent alcohols such as those mentioned above with polycarboxylic acids such as succinic acid, adipic acid, hexane-1,6-dicarboxylic acid, phthalic acid, terephthalic acid and the like. Any of those active hydrogen containing compounds disclosed in U.S. Pat. 3,201,372 and mixtures thereof may also be employed.

The biuret-containing polyisocyanates used in the practice of this invention are preferably prepared by reacting diisocyanates with water at a molar ratio of at least 3:1 and preferably from about 4:1 to about 6:1 as discussed, for example, in U.S. Patent 3,201,372. Any organic diisocyanate may be used to prepare the biuret polyisocyanate including, for example, 2,4-tolylene diisocyanate, 2,6-tolylene diisocyanate and mixtures of these isomers, 4,4'-diisocyanato-diphenylmethane, 4,4'-diisocyanato-diphenylpropane, 1,5-diisocyanato-naphthalene, 1,4-tetramethylene diisocyanate, 1,6-hexamethylene diisocyanate and any of those mentioned in U.S. Patent 3,350,362.

Any organic blowing agents may be used in addition to water in the process of this invention including, for example, esters, ketones, ethers, halogenated alkanes, especially fluorochloroalkanes such as monofluorotrichloromethane, trifluorotrichloroethane and the like. Any of those blowing agents listed in U.S. Patent 3,201,372 and mixtures thereof are also suitable.

Any suitable stabilizers may be used in the process of this invention including, in particular, compounds based on polysiloxane customarily used in the production of polyurethane foams. Any of the stabilizers or other additives disclosed in U.S. Patents 2,834,748 and 3,201,372 and mixtures thereof may be used.

Any activators for NCO/active hydrogen reactions may be used in the process of this invention including, in particular, tertiary amines such as triethylene diamine, N,N,N',N' - tetramethylbutaneamine - 1,4,N,N-dimethylbenzylamine as well as any of those listed in U.S. Patent 3,201,372; 2,948,928; 2,941,967 and 2,948,691 including metal organic catalysts such as dibutyl tin dilaurate disclosed therein.

Although the number of urea bonds is much larger than the number of polyurethane bonds in the foams prepared by the process of this invention, the properties of the foams obtained are substantially determined by the nature of the polyol component. Thus, for example, tough but hard foams can be produced from trifunctional or higher functional polyols having an OH number about 300 whereas elastic, semi-hard foams are obtained when polyols having an OH number below 100 are used.

In the process of this invention from about 20 to about 100 parts by weight, preferably 20 to 50 parts by weight, of water together with about 100 parts by weight of polyhydroxyl compound are reacted with the biuret-containing polyisocyanate at an isocyanate number of from about 20 to about 100, preferably 60 to 100. The isocyanate number is the number of NCO groups per 100 active hydrogen atoms.

The hydrophilic character of the foams can be predetermined mainly by the nature of the polyols used and by the quantity of the polyisocyanate employed. Hydrophilic foams can be produced, in particular, by using ethoxylated polyols and/or by using smaller quantities of polyisocyanate than would be required for stoichiometric reaction with the polyol and water.

The foaming reaction can be carried out either by hand or mechanically employing the usual techniques such as, for example, those disclosed in U.S. Reissue Patent 24,514.

The foams of this invention can be used industrially as cold and heat insulators, and those which have a marked hydrophilic character can be used as substrates for plant breeding and cultivation.

The invention is further illustrated but is not intended to be limited by the following examples in which all parts and percentages are by weight unless otherwise specified. All numbers in the recipes set out in the following tables are in parts by weight.

EXAMPLES 1 TO 9

Table I shows the recipes used in a series of tests in which the polyol is ethoxylated 1,1,1-trimethylol propane, OH number=536 (TMP Eox), the polyisocyanate is a biuret polyisocyanate (BPI) prepared by reacting water with a mixture of 2,4-tolylene-diisocyanate and 2,6-tolylene-diisocyanate (80:20) and having an NCO content of 35.4%.

EXAMPLES 10 TO 18

Table II shows the recipes of a series of tests which differ from those in Table I only in that ethoxylated sorbitol having an OH number of 533 (SBT Eox) is also used in the formulations.

EXAMPLES 19 TO 25

Toble III shows the recipes of a series of tests similar to that of Table I but using propoxylated 1,1,1-trimethylol propane having an OH number of 540 (TMP Pox) as the polyol.

EXAMPLES 26 TO 28

Table IV summarizes a few typical properties of tough, hard foams produced by the process of the invention.

EXAMPLES 29 TO 32

Table V shows how the hydrophilic character of a foam increases with increasing isocyanate number.

The foams produced by manual or mechanical mixing are distinguished by their tough, elastic character and their dimensional stability at high and low temperatures as well as by the fact that their hydrophilic character increases with decreasing proportions of isocyanate.

TABLE I

| Example | 1 | 2 | 3 | 4 | 5 | 6 | 7 | 8 | 9 |
|---|---|---|---|---|---|---|---|---|---|
| TMP Eox | 100 | 100 | 100 | 100 | 100 | 100 | 100 | 100 | 100 |
| $CFCl_3$ | 40 | 40 | 40 | 40 | 40 | 40 | 40 | 40 | 60 |
| $H_2O$ | 28 | 28 | 28 | 28 | 28 | 32 | 36 | 40 | 28 |
| Stabilizer (polyoxyalkylene-polysiloxaneblockcopolymer) | 4 | 4 | 4 | 4 | 4 | 4 | 6 | 6 | 4 |
| Activator (triethylene diamine) | 1.2 | 1.2 | 1.2 | 1.2 | 1.2 | 1.2 | 1.6 | 1.6 | 1.2 |
| BPI | 532 | 480 | 428 | 372 | 320 | 592 | 652 | 712 | 532 |
| Coefficient [1] | 100 | 90 | 80 | 70 | 60 | 100 | 100 | 100 | 100 |
| Bulk density (kg./m.³) | 9.9 | 8.5 | 9.0 | 7.7 | 8.0 | 9.5 | 9.2 | 8.8 | 8.6 |

[1] Isocyanate coefficient. The value 100 is the value for the stoichiometric ratio of reactants

TABLE II

| Example | 10 | 11 | 12 | 13 | 14 | 15 | 16 | 17 | 18 |
|---|---|---|---|---|---|---|---|---|---|
| TMP Eox | 80 | 80 | 80 | 80 | 80 | 80 | 80 | 80 | 80 |
| SBT Eox | 20 | 20 | 20 | 20 | 20 | 20 | 20 | 20 | 20 |
| $CFCl_3$ | 40 | 40 | 40 | 40 | 40 | 40 | 40 | 40 | 60 |
| $H_2O$ | 28 | 28 | 28 | 28 | 28 | 32 | 36 | 40 | 28 |
| Stabilizer (polyoxyalkylene-polysiloxaneblockcopolymer) | 4 | 4 | 4 | 4 | 4 | 4 | 6 | 6 | 4 |
| Activator (triethylene diamine) | 1.2 | 1.2 | 1.2 | 1.2 | 1.2 | 1.2 | 1.6 | 1.6 | 1.2 |
| BPI | 532 | 480 | 428 | 372 | 320 | 592 | 652 | 712 | 532 |
| Coefficient [1] | 100 | 90 | 80 | 70 | 60 | 100 | 100 | 100 | 100 |
| Bulk density (kg./m.³) | 9.3 | 8.9 | 8.7 | 7.9 | 8.5 | 9.0 | 8.7 | 9.2 | 8.1 |

[1] Isocyanate coefficient. The value 100 is the value for the stoichiometric ratio of reactants.

TABLE III

| Example | 19 | 20 | 21 | 22 | 23 | 24 | 25 |
|---|---|---|---|---|---|---|---|
| TMP Pox | 100 | 100 | 100 | 100 | 100 | 100 | 100 |
| $CFCl_3$ | 40 | 40 | 40 | 40 | 40 | 40 | 40 |
| $H_2O$ | 28 | 28 | 28 | 28 | 28 | 28 | 28 |
| Stabilizer (polyoxyalkylene-polysiloxane-blockcopolymer) | 10 | 10 | 10 | 10 | 10 | 10 | 10 |
| Activator (triethylene diamine) | 1.2 | 1.2 | 1.2 | 1.2 | 1.2 | 1.2 | 1.2 |
| BPI | 524 | 472 | 446 | 420 | 394 | 368 | 316 |
| Coefficient [1] | 100 | 90 | 85 | 80 | 75 | 70 | 602 |
| Bulk density (kg./m.³) | 8.6 | 8.6 | 8.1 | 8.1 | 8.0 | 7.6 | 72 |

[1] Isocyanate coefficient. The value 100 is the value for the stoichiometric ratio of reactants.

TABLE IV

| Example | 26 | 27 | 38 |
|---|---|---|---|
| Polyether of trimethylol propane and ethylene oxide (QH number 550) | 12.5 | 25 | |
| Polyethylene glycol (QH number 187) | 12.5 | | |
| Polyether of trimethylol propane and ethylene oxide (OH number 35)g | | | 40 |
| Water | 7 | 6 | 7 |
| CCl₃F | 10 | 15 | 15 |
| Silicon stabilizer (polyoxyalkylenepolysiloxane-blockcopolymer) | 1.5 | 1.5 | |
| Tetramethylbutane diamine | 0.5 | 0.5 | 0.5 |
| BPI (34.5% NCO) | 126 | 121 | 109 |
| Coefficient[1] | 100 | 100 | 100 |
| Bulk density (kg./,³) | 9 | 10 | 11 |
| Compression strength (kg. wt./cm.²) | 0.4 | 0.4 | 0.1 |
| Bending resistance (° C.) | 154 | 150 | 130 |
| Tensile strength (kg. wt./cm.²): | | | |
| In the direction of foaming | 0.6 | 0.3 | 0. |
| Perpendicularly to the direction of foaming | 1.3 | 1.2 | 0.56 |
| Elongation at break (percent): | | | |
| In the direction of foaming | 8.6 | 7.4 | 30 |
| Perpendicularly to the direction of foaming | 8.0 | 4.0 | 10 |
| Change in contour (percent): | | | |
| 3 hr. at −30° C | 0 | 0 | 0 |
| 5 hr. at +100° C | 0 | 0 | 0 |
| 5 hr. at +150° C | 0 | 0 | 0 |
| 5 hr. at +180° C | 0 | 0 | 1 |
| Percent open cells | 92 | 90 | 99 |
| Coefficient of thermal conductivity (Kcal./mh./degree) | 0.039 | 0.039 | 0.039 |

[1] Isocyanate coefficient. The value 100 is the value for the stoichiometric ratio of reactants.

TABLE V.—WATER UPTAKE AT VARIOUS COEFFICIENTS

| Example | 29 | 30 | 31 | 32 |
|---|---|---|---|---|
| Mixed polyester of adipic acid, phthalic acid, glycerol and trimethylol propane (OH number 280) | 20 | 20 | 20 | 20 |
| Glycerol | 5 | 5 | 5 | 5 |
| Water | 7 | 7 | 7 | 7 |
| Sulphonated castor oil | 7 | 7 | 7 | 7 |
| CCl₃F | 15 | 15 | 15 | 15 |
| Dimethylbenzylamine | 3 | 3 | 3 | 3 |
| Silicone stabilizer (polyoxyalkylene-polysiloxane-blockcopolymer) | 2.5 | 2.5 | 2.5 | 2.5 |
| BPI (NCO 34.5%) | 136 | 96 | 68 | 41 |
| Coefficient[1] | 100 | 70 | 50 | 30 |
| Water uptake in vol. percent at 3 hr. storage (floating on water) | 0 | 2 | 12 | 28 |

[1] Isocyanate coefficient. The value 100 is the value for the stoichiometric ratio of reactants.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of hydrophilic open celled foam resins having a bulk density of from about 6 to about 15 kg./m.³ which comprises reacting an organic polyisocyanate containing biuret groups with an organic compound containing at least two hydrogen atoms reactive with NCO groups and water with the proviso that the foaming reaction is carried out with from about 20 to about 100 parts by weight of water per 100 parts by weight of the organic compound having at least two hydrogen atoms reactive with NCO groups and the NCO-reactive hydrogen reaction is carried out at an isocyanate number of from about 20 to 100.

2. The process of claim 1 wherein the biuret polyisocyanate is prepared by reacting a diisocyanate with water at a molar ratio of at least 3:1.

3. The process of claim 1 wherein the foaming reaction is carried out with from about 20 to about 50 parts by weight of water per 100 parts of a polyhydroxy compound.

4. The process of claim 1 wherein the biuret polyisocyanate is prepared by reacting water with tolylene diisocyanate to an NCO content of about 35.4 percent.

5. The product of the process of claim 1.

6. The process of claim 1 wherein the reaction mixture contains an organic blowing agent.

7. The process of claim 1 wherein the isocyanate number is from about 60 to 100.

References Cited

UNITED STATES PATENTS

| 3,288,732 | 11/1966 | Chapman et al. | 260—2.5 |
| 3,526,652 | 9/1970 | Powers | 260—453 |
| 3,201,372 | 8/1965 | Wagner | 260—77.5 |
| 2,965,584 | 12/1960 | Elkin | 260—2.5 |
| 3,463,745 | 8/1969 | Hofrichter et al. | 260—2.5 |

DONALD E. CZAJA, Primary Examiner

H. S. COCKERAM, Assistant Examiner

U.S. Cl. X.R.

47—37, DIG. 7; 260—2.5 AT